United States Patent
Yamada et al.

(10) Patent No.: US 10,444,588 B2
(45) Date of Patent: Oct. 15, 2019

(54) ELECTROCHROMIC ELEMENT, OPTICAL FILTER, LENS UNIT, IMAGING APPARATUS, AND WINDOW MEMBER

(71) Applicant: CANON KABUSHIKI KAISHA, Tokyo (JP)

(72) Inventors: Kenji Yamada, Yokohama (JP); Wataru Kubo, Inagi (JP); Satoshi Igawa, Fujisawa (JP); Kentaro Ito, Tokyo (JP); Satoshi Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 15/554,318

(22) PCT Filed: Jun. 29, 2016

(86) PCT No.: PCT/JP2016/069956
§ 371 (c)(1),
(2) Date: Aug. 29, 2017

(87) PCT Pub. No.: WO2017/010360
PCT Pub. Date: Jan. 19, 2017

(65) Prior Publication Data
US 2018/0052375 A1    Feb. 22, 2018

(30) Foreign Application Priority Data

Jul. 10, 2015    (JP) .................................. 2015-138367
May 10, 2016    (JP) .................................. 2016-094449

(51) Int. Cl.
*G02F 1/153*    (2006.01)
*G02F 1/1503*    (2019.01)
(Continued)

(52) U.S. Cl.
CPC .............. *G02F 1/1503* (2019.01); *C09K 9/02* (2013.01); *G02B 5/205* (2013.01); *G02F 1/155* (2013.01);
(Continued)

(58) Field of Classification Search
CPC ......... C09K 9/02; G02B 5/205; G02F 1/1521; G02F 1/155; G02F 1/163; G02F 2001/1512; G02F 2001/1635; G02F 1/153
See application file for complete search history.

(56) References Cited

U.S. PATENT DOCUMENTS 5,274,493 A * 12/1993 Couput ................. G02F 1/1525
204/192.1
5,721,630 A * 2/1998 Horner ................. G02B 5/0252
359/10

(Continued)

FOREIGN PATENT DOCUMENTS

CN    107540708 A    1/2018
JP    2001-519922 A    10/2001
(Continued)

OTHER PUBLICATIONS

Yamamoto et al., U.S. Appl. No. 15/543,734, filed Jul. 14, 2017.
(Continued)

*Primary Examiner* — William R Alexander
*Assistant Examiner* — Balram T Parbadia
(74) *Attorney, Agent, or Firm* — Venable LLP

(57) ABSTRACT

Provided is an electrochromic element, including: a pair of electrodes; and an electrochromic layer disposed between the pair of electrodes and containing a plurality of kinds of organic electrochromic compounds, in which: at least one kind of the plurality of kinds of organic electrochromic compounds includes an organic electrochromic compound having an absorption peak in a wavelength region of 700 nm
(Continued)

or more during coloring thereof; and when an optical density in a decolored state thereof is defined as 0, a fluctuation ratio of a transmittance in a wavelength region of from 650 nm or more to 700 nm or less with respect to a central transmittance is within ±15% at an optical density of 0.3.

21 Claims, 4 Drawing Sheets

(51) Int. Cl.
*C09K 9/02* (2006.01)
*G02F 1/155* (2006.01)
*G02F 1/163* (2006.01)
*G02B 5/20* (2006.01)
*G02F 1/1514* (2019.01)

(52) U.S. Cl.
CPC .... *G02F 1/163* (2013.01); *G02F 2001/15145* (2019.01); *G02F 2001/1635* (2013.01)

(56) References Cited

U.S. PATENT DOCUMENTS

| | | | |
|---|---|---|---|
| 6,020,987 A | 2/2000 | Baumann et al. | |
| 6,952,299 B1 | 10/2005 | Fukazawa et al. | |
| 7,181,134 B2 * | 2/2007 | Kaneiwa | G02F 1/163 396/6 |
| 7,419,314 B2 * | 9/2008 | Kaneiwa | B82Y 20/00 396/506 |
| 7,474,453 B2 * | 1/2009 | Shinohara | G02B 5/205 359/265 |
| 9,145,382 B2 | 9/2015 | Yamada et al. | |
| 9,766,527 B2 | 9/2017 | Kubo et al. | |
| 2003/0053187 A1 * | 3/2003 | Roberts | C09K 9/00 359/265 |
| 2014/0362430 A1 | 12/2014 | Yamamoto et al. | |
| 2016/0041447 A1 | 2/2016 | Yamamoto et al. | |
| 2016/0223877 A1 * | 8/2016 | Magdassi | G02F 1/155 |
| 2016/0357082 A1 | 12/2016 | Kubo et al. | |
| 2017/0003563 A1 | 1/2017 | Kubo et al. | |
| 2017/0242314 A1 | 8/2017 | Kubo et al. | |
| 2017/0369771 A1 | 12/2017 | Kim et al. | |

FOREIGN PATENT DOCUMENTS

| | | | | |
|---|---|---|---|---|
| JP | 2004-093687 A | 3/2004 | | |
| WO | 98/44384 A1 | 10/1998 | | |
| WO | 2015038067 A1 * | 3/2015 | | G02F 1/155 |
| WO | 2015/088033 A1 | 6/2015 | | |
| WO | 2016/167163 A1 | 10/2016 | | |

OTHER PUBLICATIONS

Kubo et al., U.S. Appl. No. 15/708,418, filed Sep. 19, 2017.
Extended European Search Report in European Application No. 16824340.0 (dated Jan. 4, 2019).

* cited by examiner

ELECTROCHROMIC ELEMENT, OPTICAL FILTER, LENS UNIT, IMAGING APPARATUS, AND WINDOW MEMBER

TECHNICAL FIELD

The present invention relates to an electrochromic element, and an optical filter, a lens unit, an imaging apparatus, and a window member each using the electrochromic element.

BACKGROUND ART

In an imaging apparatus, such as a digital camera or a digital camcorder, an imaging signal is detected by forming a subject image photographed with an optical system on an imaging element, and it has been known that a neutral density (ND) filter is used for regulating the light quantity of the apparatus. When the ND filter is used, for example, a diaphragm at the time of image taking is opened or a shutter speed is reduced, and hence the range of images that can be represented can be widened.

Meanwhile, an electrochromic (hereinafter sometimes abbreviated as "EC") element utilizing an EC material whose optical absorption properties (a colored state and a light transmittance) are changed by the electrochemical redox reaction of the substance has been known. The EC element has been expected to find applications in a display element, a dimming window, and an optical filter because the element has, for example, the following features. The element has a transmittance in its decolored state higher than that of a liquid crystal element or the like, is not affected by polarization, and has a memory property. Inorganic EC materials each using a metal oxide, such as $WO_3$, and organic EC materials including conductive polymers, such as a polythiophene and a polyaniline, and organic low-molecular weight compounds, such as viologen and an oligothiophene, have heretofore been known as the EC materials.

The element has also been expected to find an application in a variable ND filter that can control an optical density in a stepless manner through the use of any such EC material. The variable ND filter requires an EC element that becomes gray or black in its colored state because the filter requires uniform spectral characteristics in a visible light wavelength region. The absorption wavelength of an organic EC element can be controlled to be wide by EC material design, and the optical density thereof in its colored state can be increased as compared to those of an inorganic EC element. Accordingly, the organic EC element has a wide light quantity regulation range and is hence particularly promising as the application of the variable ND filter to be mounted on an imaging apparatus.

In the spectral characteristics of the ND filter, an improvement in accuracy is required for, for example, an improvement in sensitivity of an imaging element. In particular, in order that satisfactory color reproducibility and a satisfactory color balance may be maintained, spectral characteristics in the entirety of the visible light wavelength region ranging from about 400 nm to about 700 nm have been required to be uniform. The phrase "spectral characteristics are uniform" as used herein means that a variation between transmittances at respective wavelengths in a certain wavelength region is small, and hence a transmittance spectrum is flat. A wide light quantity regulation range (light transmittance regulation range) has also been required.

In PTL 1 (corresponding to Japanese Patent Application Laid-Open No. 2004-93687), there is a description of an EC element whose color in its colored state is a gray color through the use of an inorganic EC material. In PTL 2 (corresponding to Japanese Patent Application Laid-Open No. 2001-519922), there is a description of an EC element that displays a color selected in advance through the mixing of a plurality of organic EC compounds, and there is a description that a gray color can be formed as one of the colors selected in advance.

CITATION LIST

Patent Literature

PTL 1: U.S. Pat. No. 6,952,299
PTL 2: International Publication No. WO1998/044384

SUMMARY OF INVENTION

An electrochromic element according to one aspect of the present invention includes:
a pair of electrodes; and
an electrochromic layer disposed between the pair of electrodes and containing a plurality of kinds of organic electrochromic compounds,
in which:
at least one kind of the plurality of kinds of organic electrochromic compounds includes an organic electrochromic compound having an absorption peak in a wavelength region of 700 nm or more in a colored state thereof; and
when an optical density in a decolored state thereof is defined as 0, a fluctuation ratio of a transmittance in a wavelength region of from 650 nm or more to 700 nm or less with respect to a central transmittance is within ±15% at an optical density of 0.3.

Further aspects of the present invention will become apparent from the following description of exemplary embodiments with reference to the attached drawings.

DESCRIPTION OF EMBODIMENTS

Preferred embodiments of the present invention will now be described in detail in accordance with the accompanying drawings.

The EC element of PTL 1 involves a problem in that its light quantity regulation range is narrow. Specifically, the light quantity regulation range is from 80% (in its decolored state) to 20% (in its colored state), i.e., about 0.6 in terms of a change in optical density. In addition, the EC element of PTL 2 is used in a reflective EC mirror, and hence involves a problem in that when the element is used as a variable ND filter, its spectral characteristics are insufficient.

The present invention has been made in view of such background art, and an object of the present invention is to provide an EC element having uniform spectral characteristics and a large light quantity regulation range.

An embodiment of the present invention is described in detail below.

<Electrochromic Element>

Figure 1:
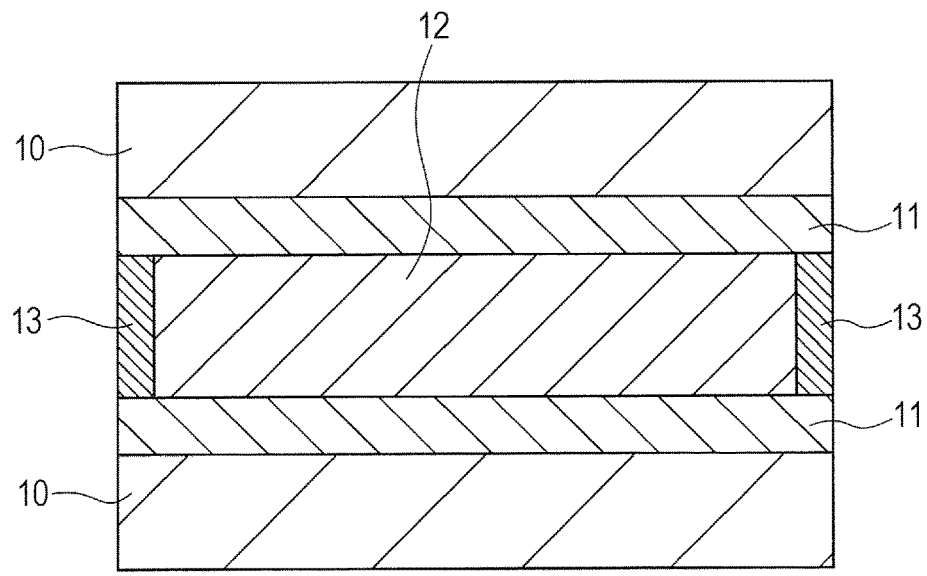
FIG. 1 is a schematic sectional view for illustrating an example of an EC element of an embodiment.

An EC element of this embodiment is described below with reference to the drawings. FIG. 1 is a schematic sectional view for illustrating an example of the EC element of this embodiment.

The EC element of FIG. 1 is an organic EC element including: a pair of transparent electrodes 11 constituted of first and second electrodes; and an EC layer 12 disposed between the pair of electrodes 11 and containing a plurality of kinds of organic EC compounds. An interelectrode distance between the pair of electrodes 11 is kept constant by a sealing material 13. In addition, the pair of electrodes 11 is disposed between a pair of transparent substrates 10. The term "transparent" as used herein means that a light transmittance in a visible light region is 10% or more and 100% or less.

The EC element of FIG. 1 is an example of the construction of the EC element of this embodiment, and the EC element of this embodiment is not limited thereto. For example, the layer of an antireflection film may be disposed between the substrate 10 and the electrode 11, or between the electrode 11 and the EC layer 12.

<Substrates 10>

The substrates 10 are each preferably a transparent substrate. For example, colorless or colored glass or tempered glass may be used, or a colorless or colored transparent resin may be used. Specific examples of the transparent resin include polyethylene terephthalate, polyethylene naphthalate, polynorbornene, polyamide, polysulfone, polyether sulfone, polyether ether ketone, polyphenylene sulfide, polycarbonate, polyimide, and polymethyl methacrylate.

<Electrodes 11>

The electrodes 11 are preferably transparent electrodes. As materials for the transparent electrodes, there may be given: metals and metal oxides, such as indium tin oxide alloy (ITO), fluorine-doped tin oxide (FTO), tin oxide (NESA), indium zinc oxide (IZO), silver oxide, vanadium oxide, molybdenum oxide, gold, silver, platinum, copper, indium, and chromium; silicon-based materials, such as polycrystalline silicon and amorphous silicon; and carbon materials, such as carbon black, graphite, and glassy carbon. In addition, a conductive polymer having its conductivity increased through, for example, doping treatment (such as polyaniline, polypyrrole, polythiophene, polyacetylene, polyparaphenylene, or a complex of polyethylene dioxythiophene (PEDOT) and polystyrene sulfonate) may also suitably be used. When the EC element is used as an optical filter, ITO, FTO, IZO, NESA, and a conductive polymer increased in conductivity that do not show any light absorption in the visible light region are each particularly preferably used because the element is required to have transparency as the optical filter. A known method can be utilized as a method of increasing the conductivity. Those materials may be used in various forms such as a bulk form and a fine particle form. One of those electrode materials may be used alone, or a plurality thereof may be used in combination.

<Sealing Material 13>

The sealing material 13 is disposed between the pair of electrodes 11, and provides a space for storing the EC layer 12. Specifically, an epoxy resin, an acrylic resin, a polyimide, Teflon (trade name), a fluororubber, or the like can be used. The sealing material 13 can retain the interelectrode distance of the EC element.

<Electrochromic Layer 12>

The EC layer 12 contains a plurality of kinds of organic electrochromic compounds, and is preferably a solution layer obtained by dissolving, in a solvent, the organic electrochromic compounds, and as required, a supporting electrolyte. One, or each of both, of an anodic EC compound that is colored by its oxidation and a cathodic EC compound that is colored by its reduction can be used as any such organic EC compound, and at least one kind of the compounds is an organic EC compound having an absorption peak in the wavelength region of 700 nm or more in its colored state. In addition, in order that a large optical density may be achieved in the colored state of the organic EC compounds, a state in which the organic EC compounds are dissolved at high concentrations is preferred, and hence the compounds each preferably have high solubility in the solvent. In addition, the compounds each preferably have high transparency in its decolored state, and hence it is preferred that each of the compounds have absorption in an ultraviolet region and be free of any absorption in a visible region in a neutral state. From the foregoing viewpoint, low-molecular weight compounds are preferred. In addition, the oxidation potentials (in the case of anodic EC compounds) or reduction potentials (in the case of cathodic EC compounds) of the organic EC compounds are preferably uniform in practical use. When the oxidation potentials or the reduction potentials largely differ from each other, the EC compounds largely differ from each other in ease of oxidation or reduction, or in rate of oxidation or reduction, and hence it may be difficult to control a color balance in the colored state.

The term "absorption peak" as used herein refers to the wavelength at which a light absorption quantity takes the largest value in a certain wavelength region. For example, the wavelength at which the light absorption quantity becomes maximum in one, or each of two or more, of wavelength regions described in (1) to (5) to be described later is defined as an absorption peak.

A first preferred aspect of the EC element of this embodiment is an EC element obtained by dissolving both an anodic EC compound and a cathodic EC compound in a solvent, and a second preferred aspect thereof is an EC element obtained by dissolving only one of the anodic and cathodic EC compounds in the solvent. The element construction of the first aspect is called a complementary EC element, and the element construction of the second aspect is called a unipolar EC element. When the complementary EC element is driven, a radical cation is produced by an oxidation reaction on one electrode, and a radical cation is produced by reduction on the other electrode. The radical cations serving as coloring species are produced on both the electrodes, and hence the complementary EC element is preferred when a large optical density (low transmittance) is needed in its colored state. Meanwhile, the complementary EC element self-erases as a result of the following: the radical cations of the anodic EC compound and the cathodic EC compound diffuse in the solution to collide with each other, and hence a redox reaction therebetween occurs. Accordingly, a large current is needed for maintaining the colored state of the element. Accordingly, the unipolar EC element is preferred from the viewpoint of the power consumption.

Specific examples of the anodic EC compound are described. A compound having absorption in the visible region during oxidation can be used as the anodic EC compound. Examples of the anodic EC compound include: a thiophene derivative; a metallocene derivative, such as ferrocene; aromatic amine derivatives, such as a phenazine derivative, a triphenylamine derivative, a phenothiazine derivative, and a phenoxazine derivative; a pyrrole derivative; and a pyrazoline derivative.

Specific structural formulae of the anodic EC compound are listed. However, the anodic EC compound to be used in this embodiment is not limited thereto.

Examples of an anodic EC compound having a light absorption peak in a short-wavelength region (region ranging from about 400 nm to about 500 nm) during oxidation coloring include compounds belonging to the following group A.

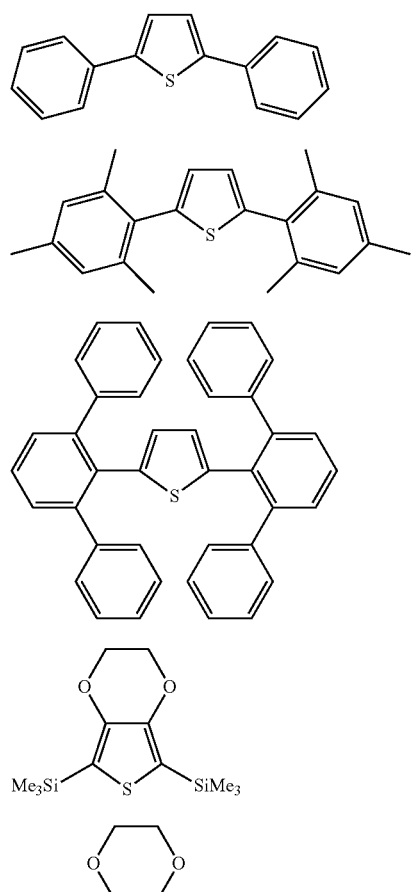

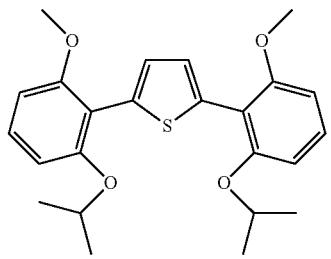

A-6

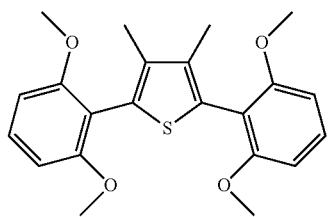

A-7

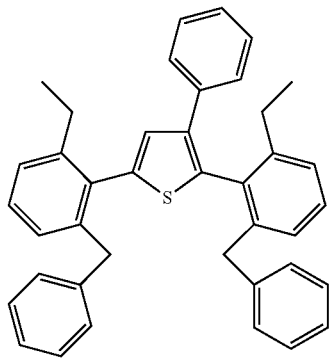

A-8

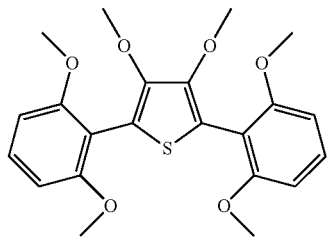

A-9

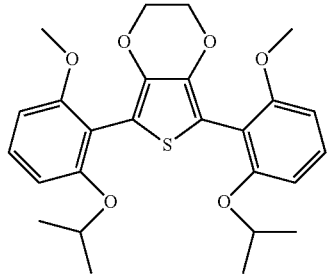

A-10

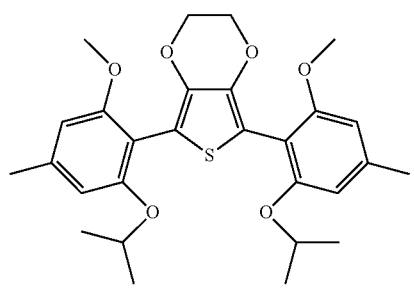
A-11
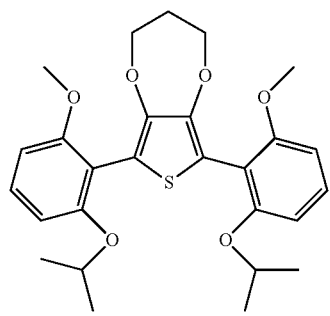
A-12
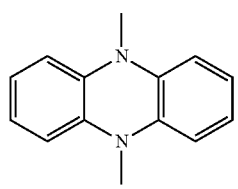
A-13
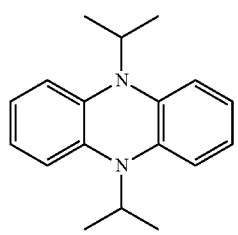
A-14
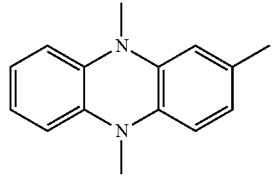
A-15
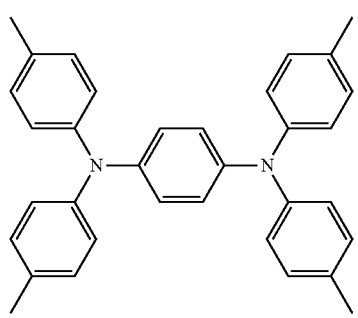
A-16
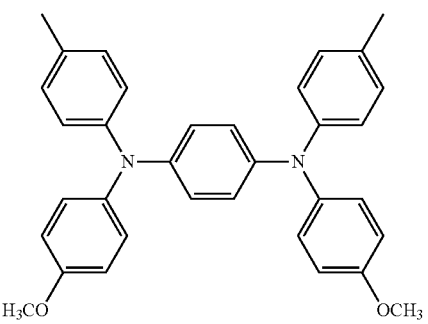
A-17
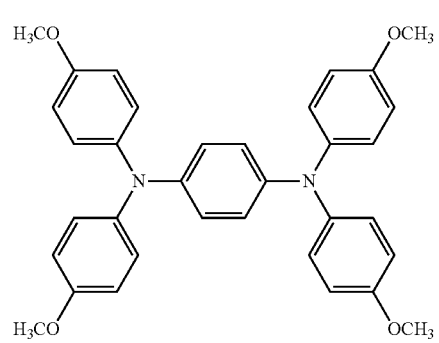
A-18
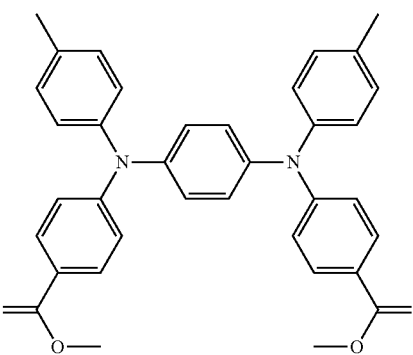
A-19
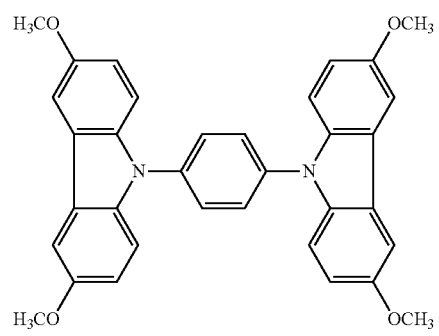
A-20

A-21 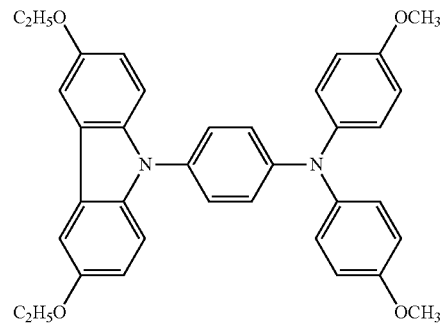
B-2 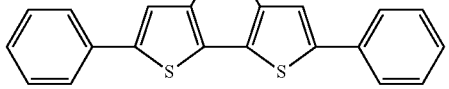
A-22 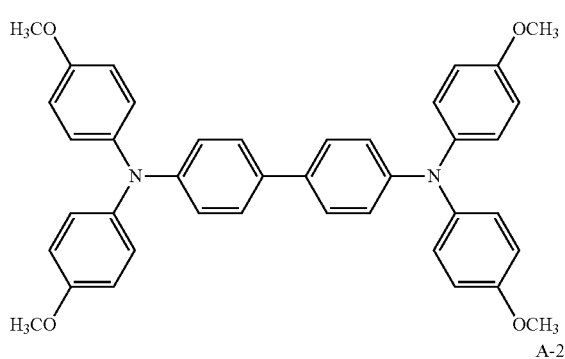
B-3 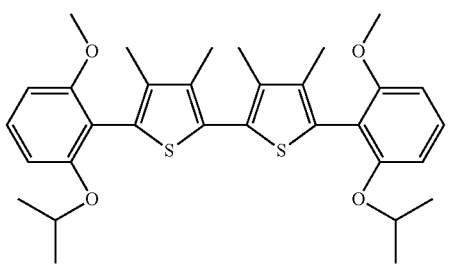
B-4 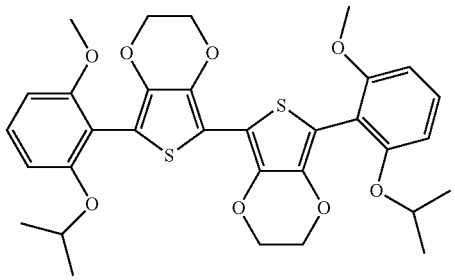
A-23 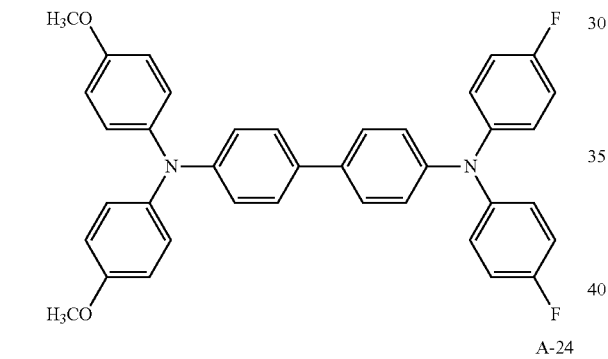
B-5 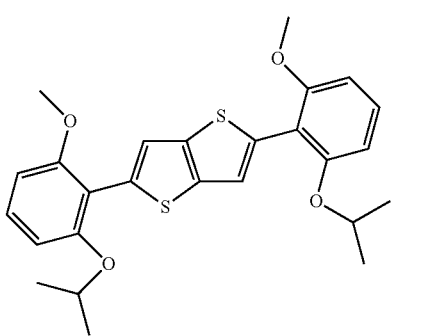
A-24 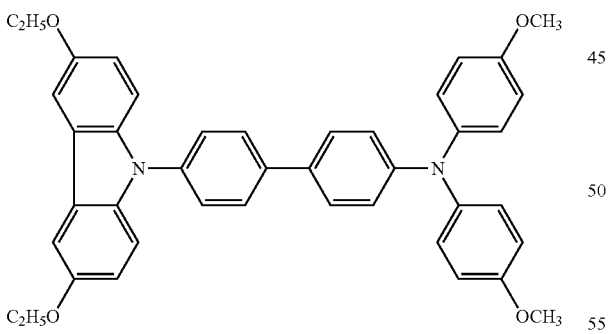
B-6 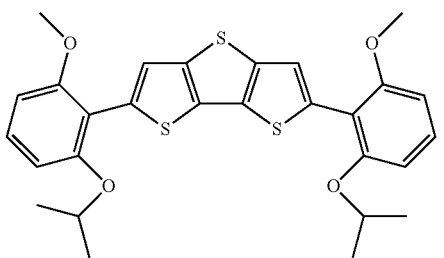
B-7 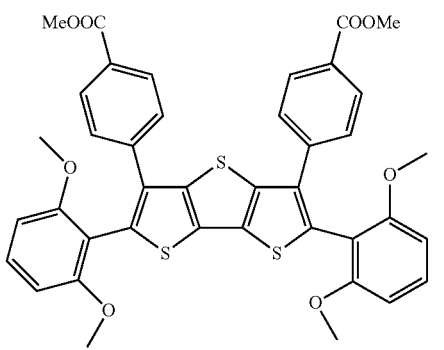
Examples of an anodic EC compound having a light absorption peak in a region ranging from about 500 nm to about 650 nm during oxidation coloring include compounds belonging to the following group B.
B-1 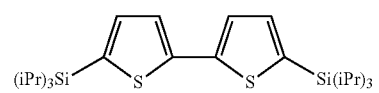

B-8
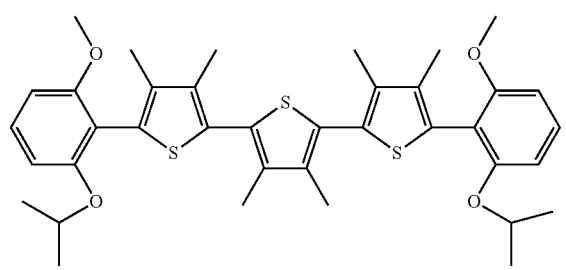

B-9
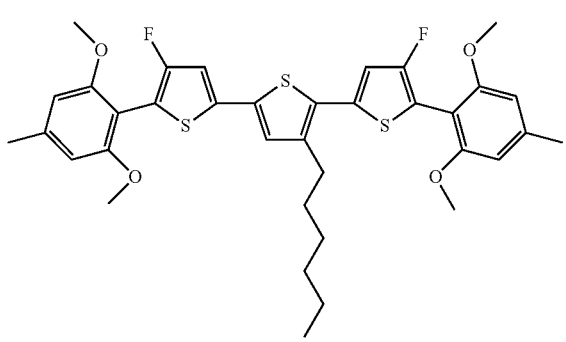

B-10
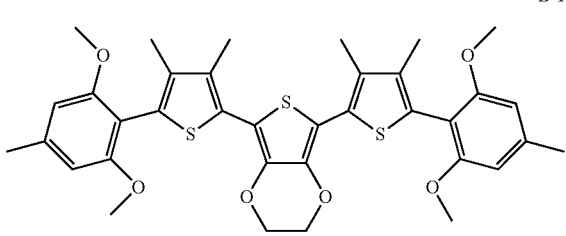

B-11
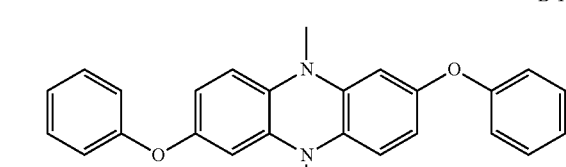

B-12
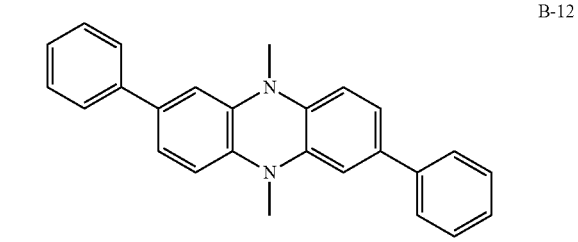

B-13
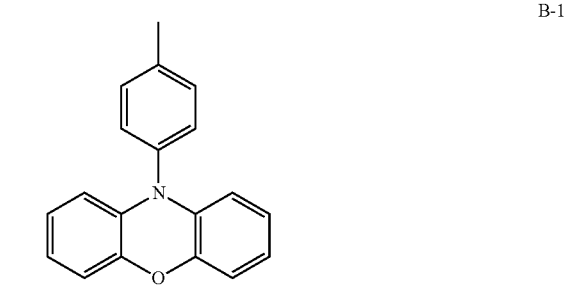

B-14
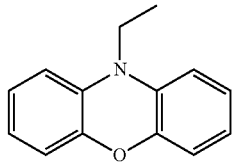

B-15
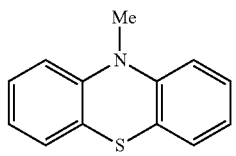

B-16
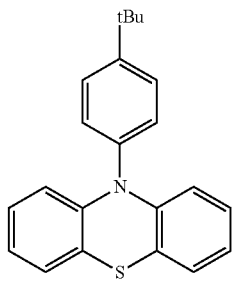

B-17
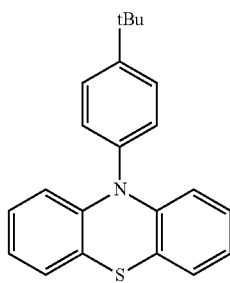

B-18

Examples of an anodic EC compound having a light absorption peak in a long-wavelength region (wavelength region of about 650 nm or more) during oxidation coloring include compounds belonging to the following group C. Of those compounds, anodic EC compounds each having a light absorption peak in the wavelength region of 700 nm or more during oxidation coloring are C-1, C-3, C-4, C-7, C-8, C-10, C-12, C-14, C-15, C-17, and C-18.

C-1
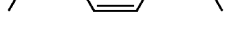

C-2
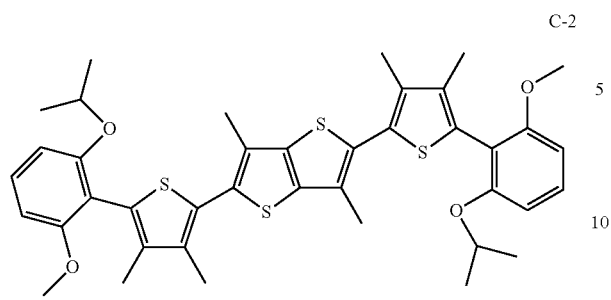
C-3
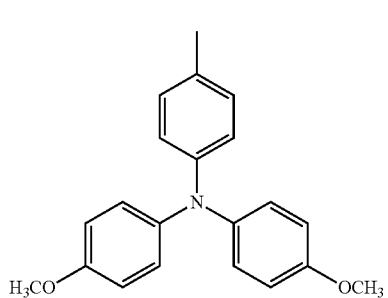
C-4
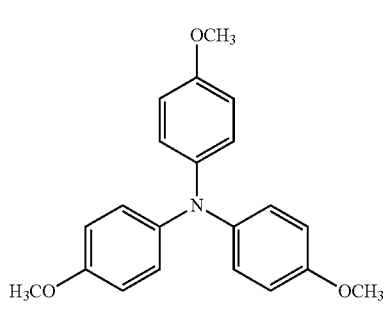
C-5
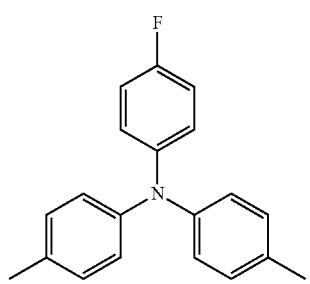
C-6
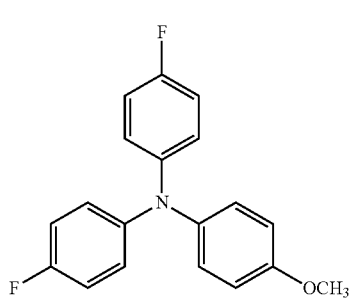
C-7
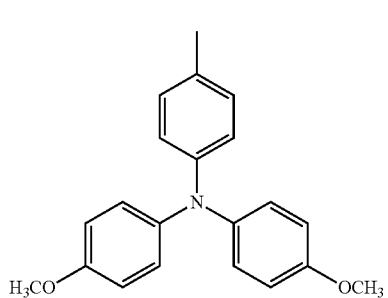
C-8
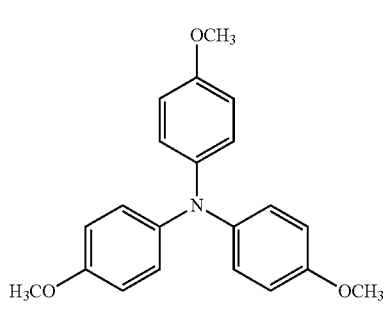
C-9
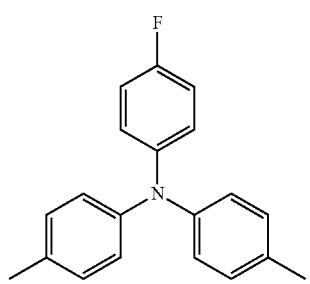
C-10
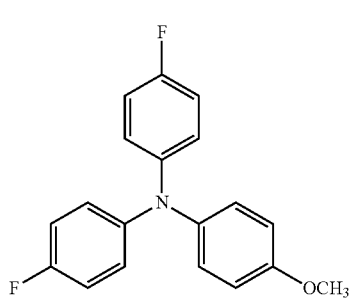
C-11
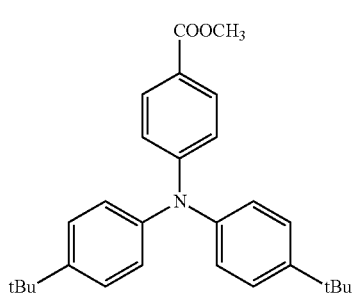

C-12 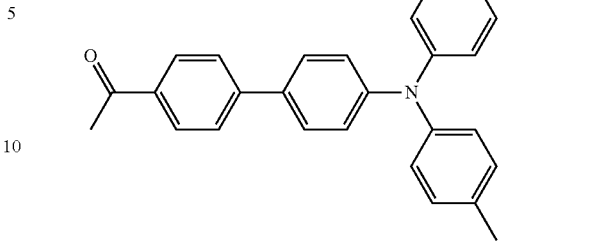

C-13 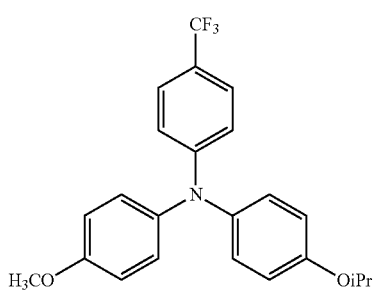

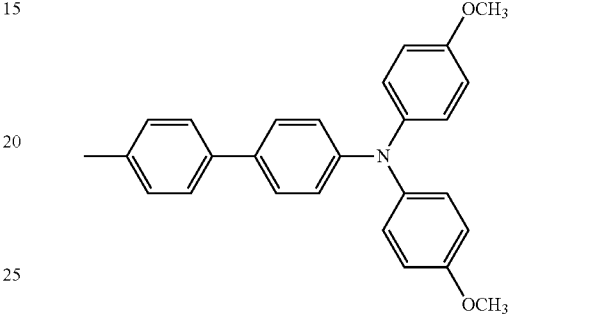 C-17

C-14 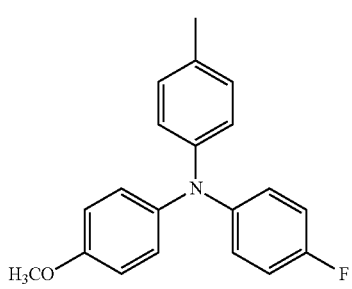

C-18

C-15 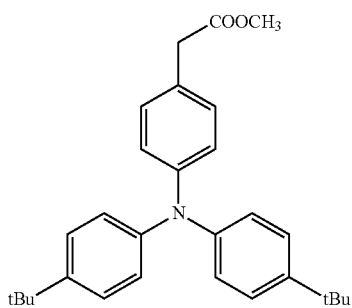

A commercial reagent may be obtained as the anodic EC compound, or the compound can be synthesized by a known synthetic method. Specific synthesis examples are as described below. For example, a thiophene derivative can be synthesized by a coupling reaction between a halide of a thiophene-based compound and an aromatic boronic acid through the use of a known Pd catalyst. In addition, an aromatic amine-based compound can be synthesized by the Ullmann reaction between a diphenylamine derivative and an aromatic halide, or a coupling reaction therebetween through the use of a Pd catalyst.

Examples of the cathodic EC compound include: viologen-based compounds, such as N,N'-diheptyl bipyridinium diperchlorate, N,N'-diethyl bipyridinium dihexafluorophosphate, N,N'-dibenzyl bipyridinium ditetrafluoroborate, and N,N'-diphenyl bipyridinium dihexafluorophosphate; anthraquinone-based compounds, such as 2-ethylanthraquinone and 2-t-butylanthraquinone; ferrocenium salt-based compounds, such as ferrocenium tetrafluoroborate and ferrocenium hexafluorophosphate; and a styryl-based compound.

C-16 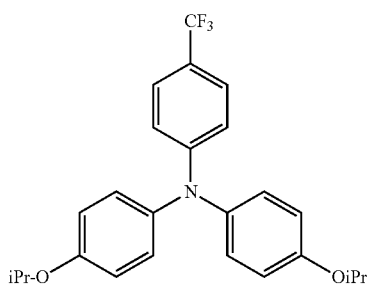

Specific structural formulae of the cathodic EC compound are listed. However, the cathodic EC compound to be used in this embodiment is not limited thereto.

Examples of a cathodic EC compound having light absorption peaks in two regions, i.e., a region ranging from about 400 nm to about 450 nm and a region ranging from about 500 nm to about 650 nm during reduction coloring include viologen-based compounds belonging to the following group D.

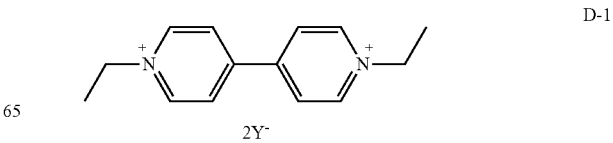 D-1

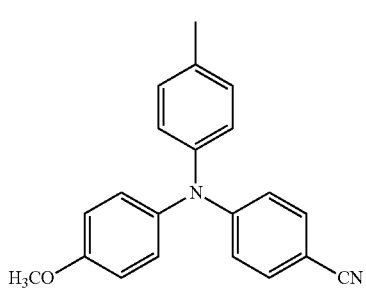

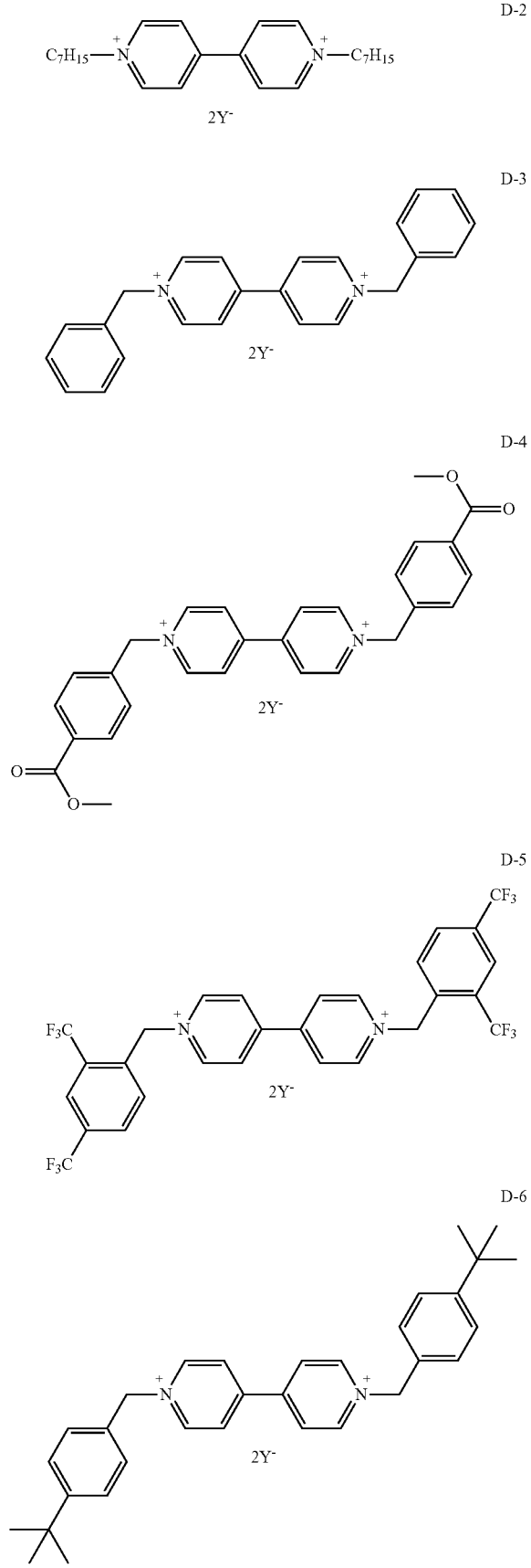
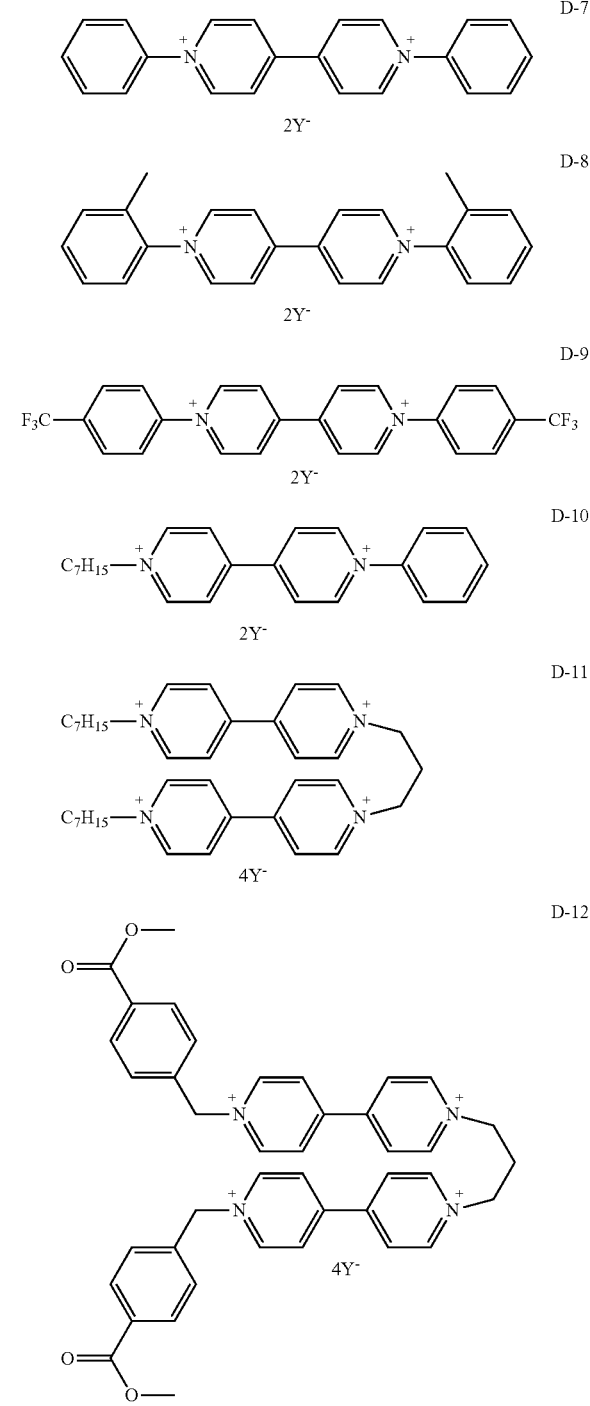

In the formulae, Y⁻ represents an anion. Examples of the anion represented by Y⁻ include: anions, such as $PF_6^-$, $ClO_4^-$, $BF_4^-$, $AsF_6^-$, $SbF_6^-$, $CF_3SO_3^-$, and $(CF_3SO_2)_2N^-$; and halogen anions, such as Br⁻, Cl⁻, and I⁻. Of those, $PF_6^-$, $ClO_4^-$, $BF_4^-$, or $(CF_3SO_2)_2N^-$ is preferred.

Examples of a cathodic EC compound having a light absorption peak in a wavelength region ranging from about 450 nm to about 600 nm during reduction coloring include anthraquinone-based compounds belonging to the following group D.

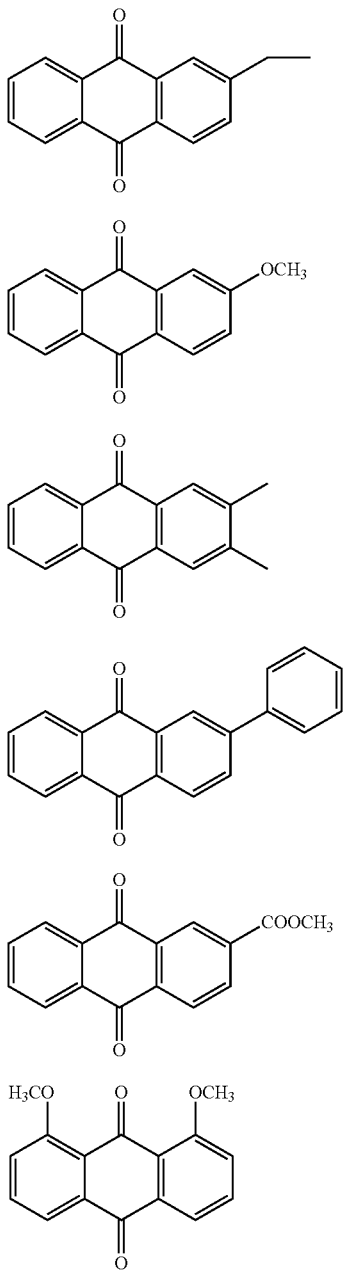

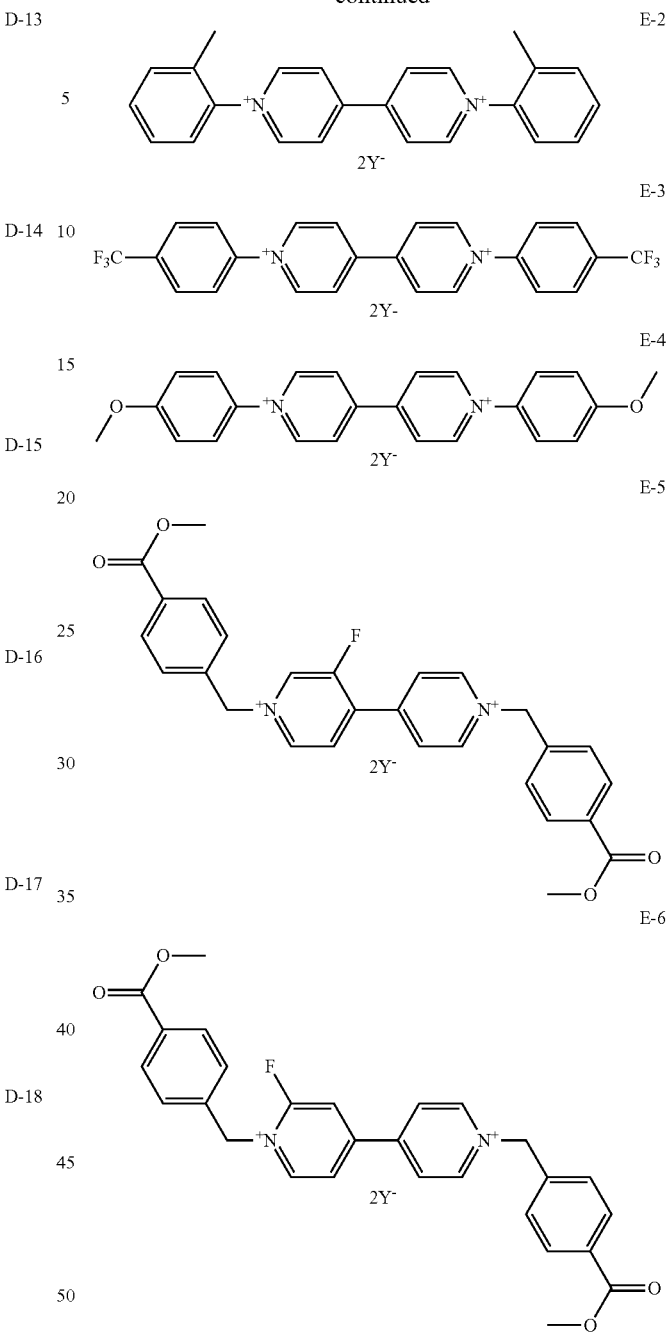

Examples of a cathodic EC compound having light absorption peaks in two regions, i.e., a region ranging from about 400 nm to about 450 nm and the wavelength region of 600 nm or more during reduction coloring include viologen-based compounds belonging to the following group E. Of those compounds, each of E-4 and E-7 is a cathodic EC compound having a light absorption peak in the wavelength region of 700 nm or more during reduction coloring.

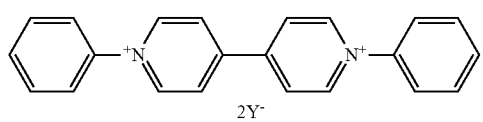

A commercial reagent may be obtained as the cathodic EC compound, or the compound can be synthesized by a known synthetic method. Specifically, for example, a viologen derivative can be synthesized by a reaction between 4,4'-bipyridine and benzyl bromide that may have a substituent.

The solvent is not particularly limited as long as the solvent can dissolve the EC compounds, and is particularly preferably a solvent having polarity. Specific examples thereof include water and organic polar solvents, such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, 3-methoxypropionitrile, benzonitrile, dimethylacetamide, methylpyrrolidinone, and dioxolane.

Further, for example, the EC medium may further contain a polymer or a gelling agent to make the EC medium a highly viscous one or a gel-like one before use. The polymer is not particularly limited, and examples thereof include polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion (trade name).

In addition, a supporting electrolyte may be added to the EC layer 12. Examples of the supporting electrolyte include: inorganic ion salts, such as various alkali metal salts and alkaline earth metal salts; a quaternary ammonium salt; and a cyclic quaternary ammonium salt. Specific examples thereof include: alkali metal salts of Li, Na, and K, such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, and $KCl$; quaternary ammonium salts, such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, and $(n-C_4H_9)_4NClO_4$; and a cyclic quaternary ammonium salt.

A method of forming the EC layer 12 is not particularly limited, and is, for example, a method involving injecting the organic EC compounds or a solution having dissolved therein the organic EC compounds into a gap formed between the pair of electrodes 11 by a vacuum injection method, an atmospheric injection method, a meniscus method, or the like. Specifically, for example, the layer can be formed by: enclosing the organic EC compounds or the solution having dissolved therein the organic EC compounds from a liquid injection hole (not shown) formed by the pair of electrodes 11 and the sealing material 13; then covering the liquid injection hole with a sealing member; and hermetically sealing the hole with an adhesive or the like. The sealing member also serves to isolate the adhesive and the EC compounds so that the adhesive and the compounds are not brought into contact with each other. The shape of the sealing member is not particularly limited.

<Spectral Characteristics>

The EC element of this embodiment has a fluctuation ratio $T_{ratio}$ of a transmittance $T_{650-700}$ in the wavelength region of from 650 nm or more to 700 nm or less with respect to a central transmittance $T_{mid}$ of within ±15%, preferably within ±10% at an optical density of 0.3 when an optical density during decoloring is defined as 0. The fluctuation ratio $T_{ratio}$ of the transmittance $T_{650-700}$ is preferably within ±40%, more preferably within ±20% at an optical density of 0.9 when the optical density during the decoloring is defined as 0, and is preferably within ±50% at an optical density of 1.5 when the optical density during the decoloring is defined as 0.

Further, the EC element of this embodiment has a fluctuation ratio $T_{ratio}$ of a transmittance $T_{430-700}$ in the wavelength region of from 430 nm or more to 700 nm or less of preferably within ±20% at an optical density of 0.3 when the optical density during decoloring is defined as 0, and preferably within ±40% at an optical density of 0.9 when the optical density during decoloring is defined as 0.

Here, when the maximum and minimum of transmittances in a certain wavelength region are defined as $T_{max}$ and $T_{in}$, respectively, the central transmittance $T_{mid}$ is represented by the following equation (1). In addition, the fluctuation ratio $T_{ratio}$ (%) of a transmittance T at an arbitrary wavelength in a certain wavelength region with respect to the central transmittance $T_{mid}$ is represented by the following equation (2).

$$T_{mid}=T_{max}+T_{min})/2 \quad (1)$$

$$T_{ratio}(\%)=(T-T_{mid})/T_{mid}\times 100 \quad (2)$$

That is, as a value for the $T_{ratio}$ becomes smaller, a variation between transmittances at respective wavelengths in a certain wavelength region becomes smaller, and hence the element has more uniform spectral characteristics.

The EC element of this embodiment has uniform spectral characteristics in the wavelength region of from 650 nm or more to 700 nm or less, preferably from 430 nm or more to 700 nm or less. That is, the element shows a small fluctuation ratio of a transmittance at each wavelength of light in the wavelength region of from 650 nm or more to 700 nm or less, preferably from 430 nm or more to 700 nm or less with respect to the central transmittance during coloring.

The EC element of this embodiment, which preferably shows a gray color or a black color during coloring, has uniform spectral characteristics up to the region of from 650 nm to 700 nm longer than a wavelength region in which a related-art EC element showing a gray color or a black color during coloring when viewed with the eyes has uniform spectral characteristics. Accordingly, in the case where the element is combined with an imaging element, particularly satisfactory color reproducibility and a particularly satisfactory color balance can be achieved without the use of any color correction unit, or even when a color correction unit is used, by the minimum correction. For example, the EC element described in PTL 2 showing a gray color during coloring when viewed with the eyes shows weak absorption in the long-wavelength region of 600 nm or more particularly during the coloring, and does not have uniform spectral characteristics up to 700 nm required for the element to be used as a variable ND filter. Accordingly, its color reproducibility and color balance are poor.

The inventors of the present invention have measured the absorption spectrum characteristics of the respective compounds during their coloring for achieving uniform spectral characteristics. An absorption spectrum at the time of the mixing of the plurality of organic EC compounds is obtained by adding the absorption spectra of the respective compounds, and the compounds can be appropriately selected so that the EC element uniformly absorbs light in a certain wavelength region at respective wavelengths. In order that spectral characteristics in the long-wavelength region of from 650 nm to 700 nm may be uniformized, in particular, the fluctuation ratio $T_{ratio}$ of the transmittance $T_{650-700}$ may be set to within ±15% at an optical density of 0.3, an organic EC compound having a light absorption peak in the wavelength region of 700 nm or more during coloring is mixed. The mixing of such organic EC compound enables the EC element obtained by mixing the plurality of EC compounds to show uniform transmittance characteristics. For example, Exemplified Compound C-1, C-3, C-4, C-7, C-8, C-10, C-12, C-14, C-15, C-17, or C-18 is suitably used as the organic EC compound having a light absorption peak in the wavelength region of 700 nm or more during the coloring. In addition, in order that both the transparency of the element during decoloring and the absorption of light in a long-wavelength region during coloring may be achieved, an aromatic amine-based compound containing an aromatic amine skeleton, such as Exemplified Compound C-7, C-8, C-10, C-12, C-14, C-15, C-17, or C-18, is particularly preferred.

In addition, in order that spectral characteristics in the wavelength region of from 430 nm or more to 700 nm or less may be uniformized, in particular, the fluctuation ratio $T_{ratio}$ of the transmittance $T_{430-700}$ may be set to within ±20% at an optical density of 0.3, the EC layer preferably contains organic electrochromic compounds each having an absorption peak in at least one of the wavelength regions described in the following (1) to (5) during coloring so that at least one absorption peak of the organic EC compounds during the coloring is present in each of the wavelength regions described in the following (1) to (5):
(1) the wavelength region of 430 nm or less;
(2) the wavelength region of from more than 430 nm to 510 nm or less;
(3) the wavelength region of from more than 510 nm to 570 nm or less;
(4) the wavelength region of from more than 570 nm to less than 700 nm; and
(5) the wavelength region of 700 nm or more.

In addition, at least one of an organic EC compound having an absorption peak in the wavelength region (2) during the coloring or an organic EC compound having an absorption peak in the wavelength region (3) during the coloring is preferably a phenazine derivative. A phenazine derivative having an absorption peak in the wavelength region (2) during the coloring is, for example, Exemplified Compound A-13, A-14, or A-15. A phenazine derivative having an absorption peak in the wavelength region (3) during the coloring is, for example, Exemplified Compound B-11 or B-12.

In addition, an organic EC compound having an absorption peak in the wavelength region (4) during the coloring is preferably a viologen derivative. Examples of the viologen derivative having an absorption peak in the wavelength region (4) during the coloring include Exemplified Compounds D-1 to D-12, and organic EC compounds listed in the group of Exemplified Compounds E.

The plurality of organic electrochromic compounds can be appropriately combined so that the fluctuation ratio $T_{ratio}$ of the transmittance $T_{650-700}$ is within ±15% at an optical density of 0.3. The layer contains, as the organic EC compound having an absorption peak in the wavelength region (4) during the coloring, for example, an organic EC compound having an absorption peak at a wavelength that differs from the wavelength of an absorption peak of an organic EC compound having the absorption peak in the wavelength region (5) by 80 nm or more and 130 nm or less.

In addition, the layer contains, as the organic EC compound having an absorption peak in the wavelength region (5) during the coloring, for example, a compound having an absorption peak in the wavelength region of from 700 nm or more to 730 nm or less. In that case, the layer preferably contains, as the organic EC compound having an absorption peak in the wavelength region (4) during the coloring, an organic EC compound having an absorption peak at a wavelength that differs from the wavelength of the absorption peak of the organic EC compound having the absorption peak in the wavelength region (5) by 80 nm or more and 130 nm or less. The layer preferably further contains, as the organic EC compound having an absorption peak in the wavelength region (4) during the coloring, a compound whose absorption peak wavelength is 650 nm or more and less than 700 nm, and differs from the wavelength of the absorption peak of the organic EC compound having the absorption peak in the wavelength region (5) by 20 nm or more and 35 nm or less.

In general, a neutral density (ND) filter reduces a quantity of light to $½^n$ (where n represents a positive integer). When the quantity of light is reduced to ½, the transmittance is reduced from 100% to 50%. When the quantity of light is reduced to ¼, the transmittance is reduced from 100% to 25%. In addition, when the transmittance is reduced to ½, from a relationship of −log(transmittance)=(optical density), the optical density change amount is 0.3, and when the transmittance is reduced to ¼, the optical density change amount is 0.6. In order to reduce the light quantity so that the transmittance varies from ½ to 1/64, it is only necessary that the optical density change amount be controlled to be from 0 to 1.8 in units of 0.3.

<Optical Filter>

An optical filter of this embodiment includes the EC element of this embodiment and an active element connected to the EC element. The active element is an element configured to adjust the quantity of light to be transmitted through the EC element, and is specifically, for example, a switching element for controlling the transmittance of the EC element. Examples of the switching element include a TFT and a MIM element. The TFT is also referred to as "thin-film transistor," and a semiconductor or an oxide semiconductor is used as a constituent material therefor. Specific examples thereof include semiconductors using amorphous silicon, low-temperature polysilicon, and InGaZnO as constituent materials.

<Imaging Apparatus and Lens Unit>

An imaging apparatus of this embodiment includes the optical filter of this embodiment and a light-receiving element configured to receive light that has passed through the optical filter.

In addition, a lens unit of this embodiment includes the optical filter of this embodiment and an imaging optical system. The imaging optical system is preferably a lens group including a plurality of lenses. The optical filter may be disposed so that light that has passed through the optical filter passes through the imaging optical system, or may be disposed so that light that has passed through the imaging optical system passes through the optical filter. In addition, the optical filter may be disposed between any one of the plurality of lenses and another lens. The optical filter is preferably disposed on the optical axis of a lens. The optical filter can adjust the quantity of light that passes through the imaging optical system or of light that has passed through the system.

Figure 4A:
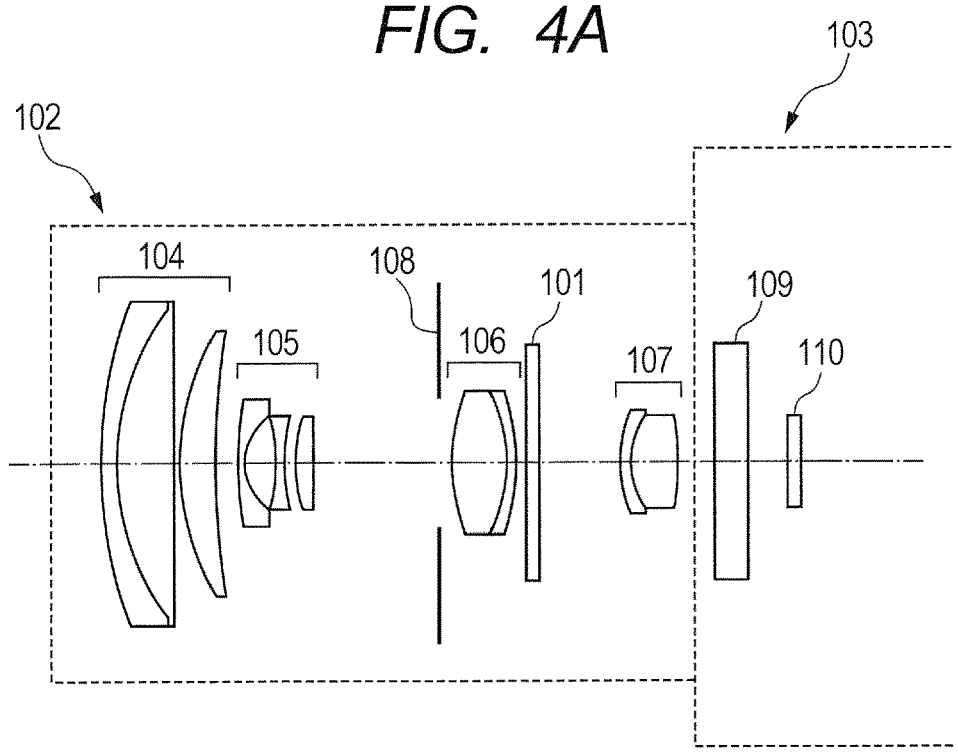
FIG. 4A is a schematic view for illustrating the construction of an imaging apparatus including a lens unit using an optical filter of the embodiment.
Figure 4B:
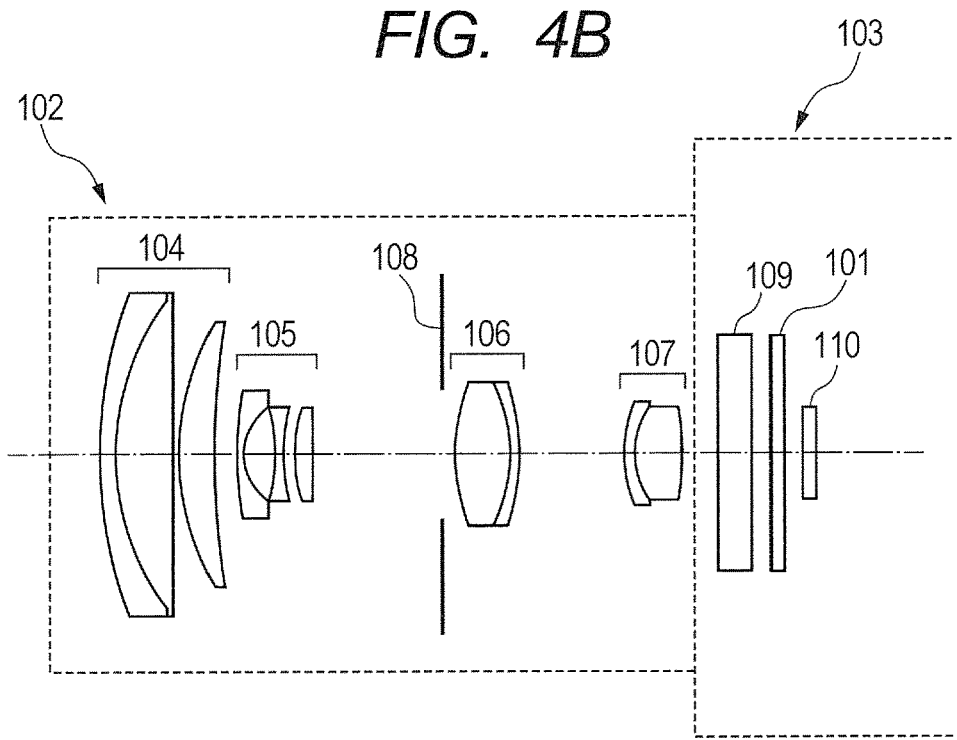
FIG. 4B is a schematic view for illustrating the construction of the imaging apparatus including the optical filter of the embodiment.

FIG. 4A is a schematic view for illustrating the construction of an imaging apparatus including a lens unit using the optical filter of this embodiment, and FIG. 4B is a schematic view for illustrating the construction of the imaging apparatus including the optical filter of this embodiment. As illustrated in FIG. 4A and FIG. 4B, a lens unit 102 is removably connected to an imaging unit 103 through a mounting member (not shown).

The lens unit 102 is a unit including a plurality of lenses or lens groups. For example, the lens unit 102 illustrated in FIG. 4A is a rear-focus zoom lens configured to perform focusing behind a diaphragm. The lens unit 102 includes, in order from a subject side (left side of the drawing), four lens groups of a first lens group 104 having a positive refractive power, a second lens group 105 having a negative refractive power, a third lens group 106 having a positive refractive power, and a fourth lens group 107 having a positive refractive power. An interval between the second lens group 105 and the third lens group 106 is changed to vary magnification, and a part of lenses of the fourth lens group 107 is moved to perform focusing. For example, the lens unit 102 includes a diaphragm 108 disposed between the second lens group 105 and the third lens group 106, and further includes an optical filter 101 disposed between the third lens group 106 and the fourth lens group 107. Those components are disposed so that the light to be transmitted through the lens unit 102 is transmitted through the lens groups 104 to 107, the diaphragm 108, and the optical filter 101, and the quantity of light can be adjusted with the use of the diaphragm 108 and the optical filter 101.

In addition, a configuration of the components of the lens unit 102 can be modified appropriately. For example, the optical filter 101 may be disposed in front of the diaphragm 108 (on the subject side thereof), or may be disposed behind the diaphragm 108 (on the imaging unit 103 side thereof). Alternatively, the optical filter 101 may be disposed in front of the first lens group 104, or may be disposed behind the fourth lens group 107. When the optical filter 101 is disposed at a position where light converges, there is an advantage in that the area of the optical filter 101 can be reduced, for example. In addition, a mode of the lens unit 102 can also be selected appropriately. Instead of the rear-focus zoom lens, the lens unit 102 may also be an inner-focus zoom lens configured to perform focusing in front of the diaphragm, or may be another type of zoom lens configured to perform focusing in another way. In addition, instead of the zoom lens, a special-purpose lens, such as a fisheye lens or a macro lens, can also be selected appropriately.

The imaging unit 103 includes a glass block 109 and a light-receiving element 110. The glass block 109 is a glass block such as a low-pass filter, a face plate, or a color filter. In addition, the light-receiving element 110 is a sensor unit configured to receive light that has passed through the lens unit 102, and an imaging element, such as a CCD or a CMOS, may be used as the light-receiving element 110. In addition, the light-receiving element 110 may also be an optical sensor, such as a photodiode, and a device configured to acquire and output information on intensity or wavelength of light can be used appropriately as the light-receiving element 110.

When the optical filter 101 is built into the lens unit 102 as illustrated in FIG. 4A, a driving unit, such as an active element, may be disposed within the lens unit 102, or may be disposed outside the lens unit 102. When the driving unit is disposed outside the lens unit 102, the EC element and the driving unit, which are respectively disposed within and outside the lens unit 102, are connected to each other through wiring, and the driving unit drives and controls the EC element.

As illustrated in FIG. 4B, the imaging apparatus itself may include the optical filter 101 of this embodiment. The optical filter 101 is disposed at an appropriate position within the imaging unit 103, and it is only necessary that the light-receiving element 110 be disposed so as to receive the light that has passed through the optical filter 101. In FIG. 4B, for example, the optical filter 101 is disposed immediately in front of the light-receiving element 110. When the imaging apparatus itself has the optical filter 101 built therein, the lens unit 102 itself connected to the imaging apparatus does not need to include the optical filter 101, and hence the imaging apparatus using an existing lens unit and being capable of controlling light can be formed.

The imaging apparatus described above is applicable to a product having a combination of a function of adjusting a light quantity and a light-receiving element. The imaging apparatus can be used in, for example, a camera, a digital camera, a video camera, or a digital video camera. The imaging apparatus is also applicable to a product having the imaging apparatus built therein, such as a mobile phone, a smartphone, a PC, or a tablet computer.

Through the use of the optical filter of this embodiment as a dimming member, a light quantity to be controlled can be appropriately varied with the use of one filter, and there are advantages in that the number of members can be reduced and that a space can be saved, for example.

<Window Member>

Figure 5A:
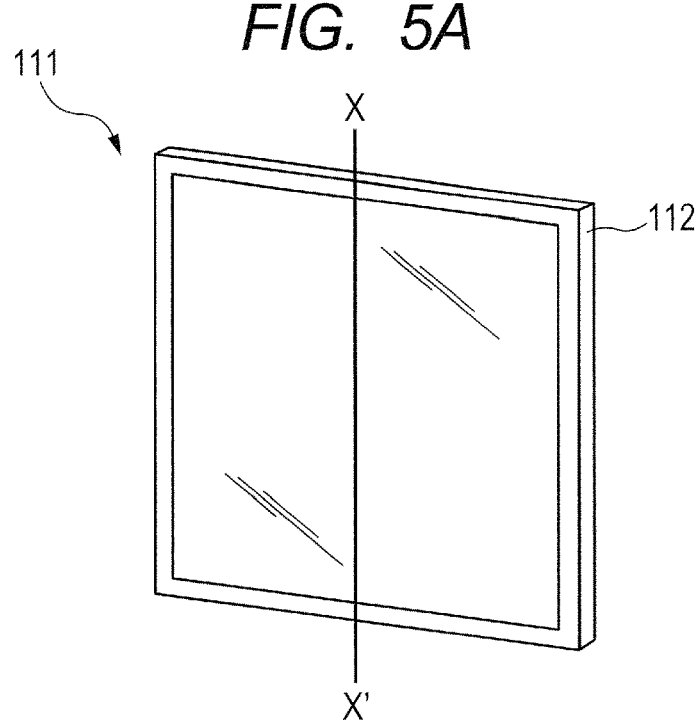
FIG. 5A is a perspective view for illustrating the construction of a window member of the embodiment.

A window member of this embodiment includes the EC element of this embodiment and an active element connected to the EC element. FIG. 5A is a perspective view for illustrating the construction of the window member of this embodiment, and FIG. 5B is an X-X' sectional view of FIG. 5A.

Figure 5B:
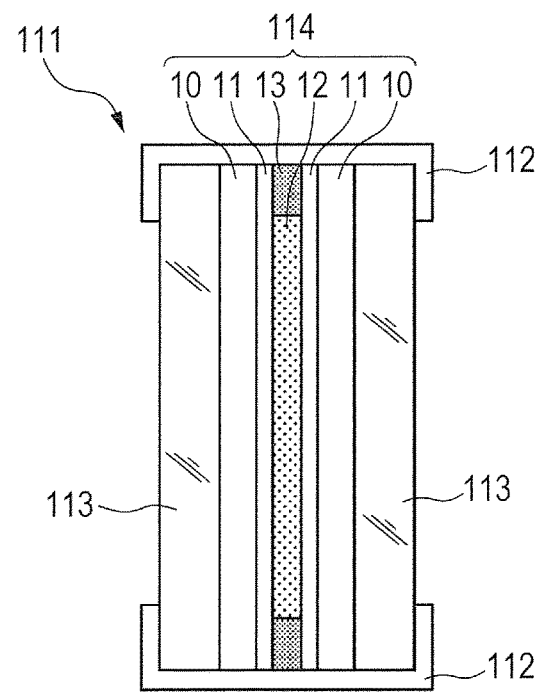
FIG. 5B is an X-X' sectional view for illustrating the construction of the window member of the embodiment.

A window member 111 of FIG. 5B is a dimming window, and includes an EC element 114, transparent plates 113 configured to sandwich the element, and a frame 112 configured to surround the entirety to integrate the element and the plates. The active element is an element configured to adjust the quantity of light to be transmitted through the EC element 114, and may be directly connected to the EC element 114 or may be indirectly connected thereto. In addition, the active element may be integrated in the frame 112, or may be connected to the EC element 114 through a wiring disposed outside the frame 112.

The transparent plates 113 are not particularly limited as long as being made of a material having a high light transmittance. Considering the use of the window member 111 as a window, it is preferred that the transparent plates 113 be made of glass materials. In this embodiment, the EC element 114 is a constituent member independent of the transparent plates 113, but for example, the substrates 10 of the EC element 114 may be regarded as the transparent plates 113.

A material property of the frame 112 is not limited, but any member that covers at least a part of the EC element 114 and has a form of being integrated into one frame may be regarded as the frame.

Such dimming window can also be referred to as "window member having an electronic curtain," and provides a sufficient quantity of transmitted light relative to incident light when the EC element 114 is in a decolored state, and provides optical characteristics in which the incident light is blocked and modulated with reliability when the element is in a colored state. The window member of this embodiment is applicable to, for example, use of adjusting a quantity of sunlight entering a room during the daytime. The window member can be used to adjust not only the quantity of sunlight but also a heat quantity, and hence can be used to control brightness and temperature of the room. In addition, the window member is also applicable to use as a shutter to prevent an indoor view from being seen from the outside of the room. The dimming window described above is applicable not only to a glass window for a construction, but also to a window of a vehicle such as an automobile, a train, an airplane, or a ship, and to a filter of a display surface of a clock, a watch, or a mobile phone.

EXAMPLES

Example 1

Exemplified Compounds A-22 (54 mM), C-5 (7 mM), and C-10 (15 mM) serving as anodic EC compounds, and Exemplified Compounds D-4 (28 mM), D-10 (140 mM), and D-11 (130 mM) serving as cathodic EC compounds were mixed, and a voltage was applied to the mixture to color the compounds. An absorption spectrum in the wavelength region of from 430 nm to 750 nm in that case is shown in FIG. 2.

Figure 2:
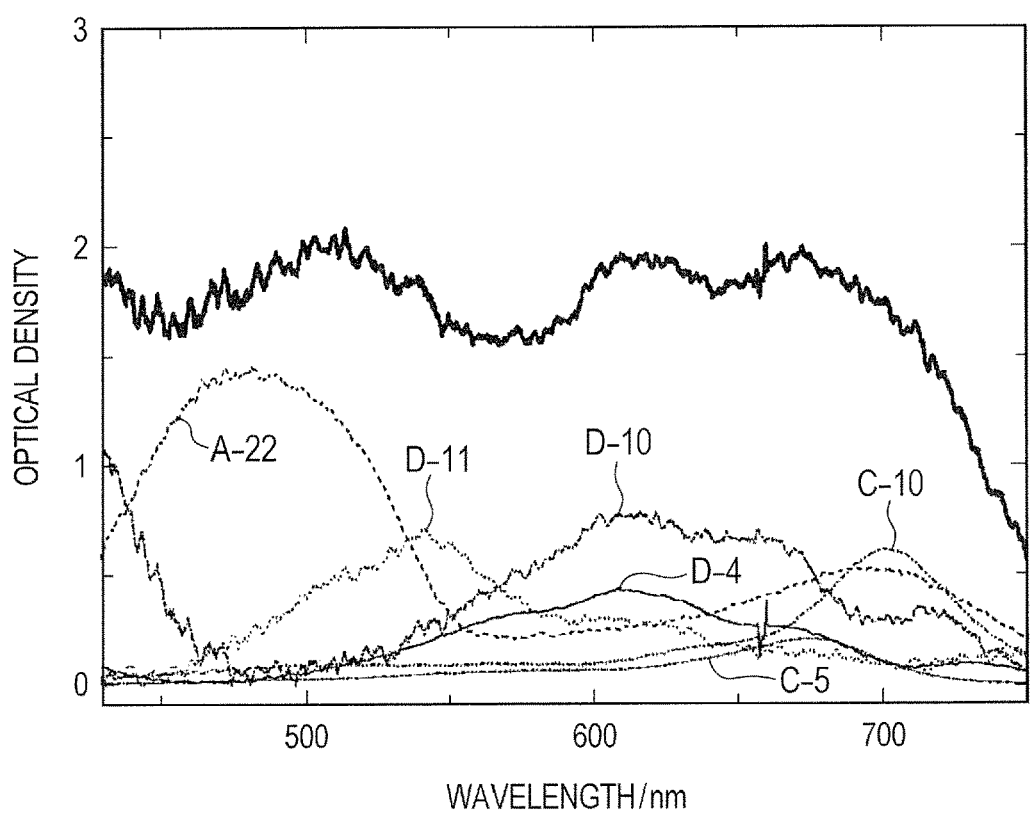
FIG. 2 is a graph for showing the absorption spectrum of an EC element in Example 1.

The absorption spectrum of FIG. 2 is obtained by adding absorption spectra when the respective compounds are each dissolved at a concentration of 0.5 mM in propylene carbonate and a voltage is applied to the solution. A product obtained as follows was used in the measurement of the absorption spectra of the respective compounds: a mesh-like platinum electrode (working electrode; WE) and a wire-shaped platinum electrode (counter electrode; CE) were disposed in a glass cell having an optical path length of 1 mm, and a reference electrode RE (Ag/Ag$^+$) was disposed in the cell. An EC material was oxidized and colored on the mesh electrode, and its ultraviolet-visible-near infrared absorption spectrum was measured with transmitted light passing through the mesh electrode. A potentiostat manufactured by Solartron (CellTest 1470E) was used in the application of a driving voltage, and a spectroscope manufactured by Ocean Optics (USB2000-UV-VIS) was used in spectrometry.

Figure 3A:
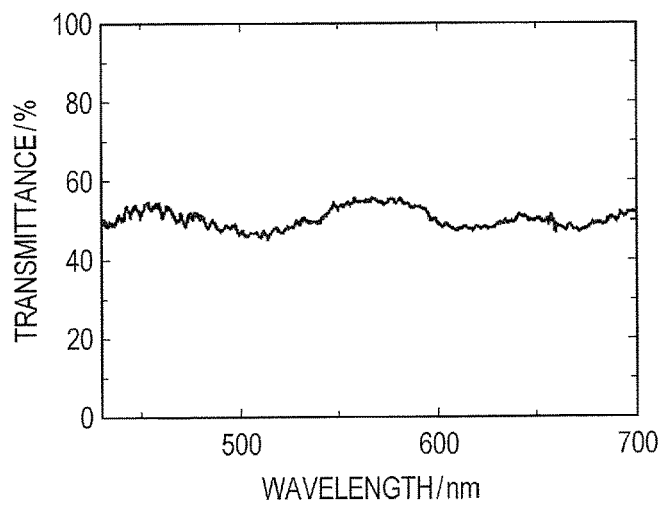
FIG. 3A is a graph for showing the transmittance spectrum of the EC element in Example 1 at an optical density of 0.3.
Figure 3B:
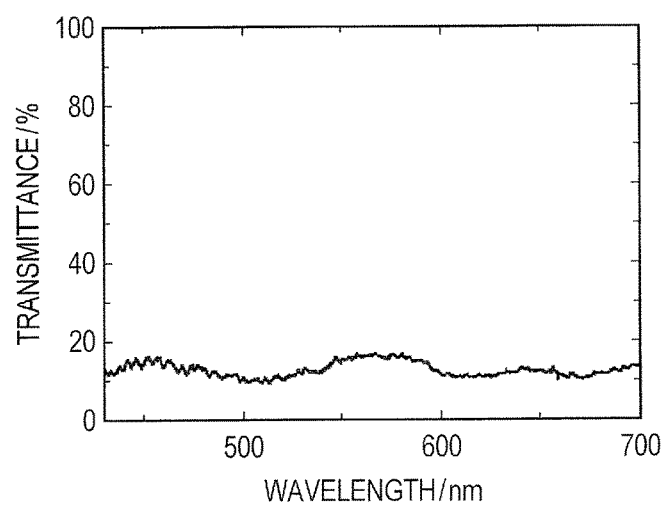
FIG. 3B is a graph for showing the transmittance spectrum of the EC element in Example 1 at an optical density of 0.9.
Figure 3C:
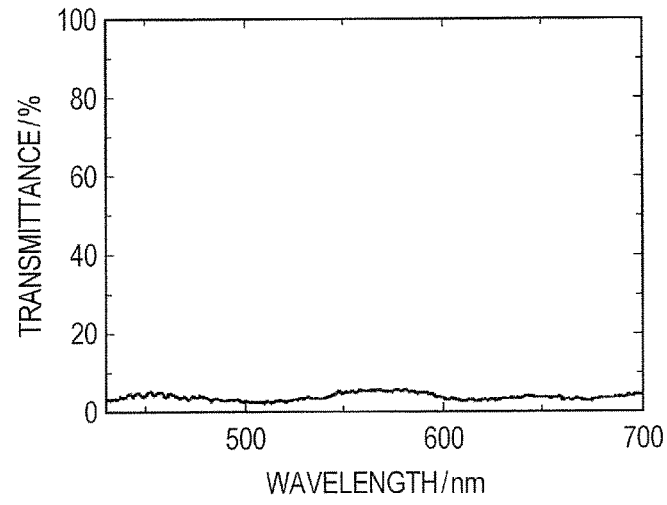
FIG. 3C is a graph for showing the transmittance spectrum of the EC element in Example 1 at an optical density of 1.5.

Next, transmittance spectra were determined based on the absorption spectrum shown in FIG. 2 from the relational expression −log(transmittance)=(optical density). The determined spectra are shown in FIG. 3A to FIG. 3C. A spectrum at an optical density of 0.3 when the optical density of FIG. 2 is defined as 0 is shown in FIG. 3A. A spectrum at an optical density of 0.9 when the optical density of FIG. 2 is defined as 0 is shown in FIG. 3B. A spectrum at an optical density of 1.5 when the optical density of FIG. 2 is defined as is shown in FIG. 3C. In FIG. 3B, the maximum transmittance $T_{max}$ and the minimum transmittance $T_{min}$ in the wavelength region of from 650 nm or more to 700 nm or less were 13.8% and 10.9%, respectively, and hence the central transmittance $T_{mad}$ therebetween was 12.35%. The fluctuation ratio $T_{ratio}$ with respect to the central transmittance $T_{mid}$ in this case is ±11.7%. A value for the fluctuation ratio $T_{ratio}$ with respect to the central transmittance $T_{mid}$ in the case of FIG. 3A or FIG. 3C is similarly shown in Table 1.

Further, the maximum transmittance $T_{max}$ and the minimum transmittance $T_{min}$ in the wavelength region of from 430 nm or more to 700 nm or less in FIG. 3B were 16.9% and 9.3%, respectively, and hence the $T_{ratio}$ became ±29.0%. A value for the fluctuation ratio $T_{ratio}$ with respect to the central transmittance $T_{mid}$ in the case of FIG. 3A or FIG. 3C is similarly shown in Table 1. In this example, the absorption peak wavelengths of the exemplified compounds during their coloring are as described below.

A-22: 482 nm
C-5: 675 nm
C-10: 701 nm
D-4: 606 nm and 401 nm
D-10: 616 nm and 417 nm
D-11: 542 nm That is, in this example, wavelength regions including the absorption peaks of the exemplified compounds during the coloring are as described below.

A-22: (2) from more than 430 nm to 510 nm or less
C-5: (4) from more than 570 nm to less than 700 nm
C-10: (5) 700 nm or more
D-4: (1) 430 nm or less and (4) from more than 570 nm to less than 700 nm
D-10: (1) 430 nm or less and (4) from more than 570 nm to less than 700 nm
D-11: (3) from more than 510 nm to 570 nm or less The EC element of this example contains Exemplified Compounds D-4 and D-10 each having an absorption peak at a wavelength that differs from the wavelength of the absorption peak of Exemplified Compound C-10, which is an organic EC compound having an absorption peak in the wavelength region (5), during the coloring by 80 nm or more and 130 nm or less.

Exemplified Compound C-10 is a compound having an absorption peak in the wavelength region of from 700 nm or more to 730 nm or less, and the wavelength of the absorption peak of each of Exemplified Compounds D-4 and D-10 during the coloring differs from the wavelength of the absorption peak of Exemplified Compound C-10 by 80 nm or more and 130 nm or less. Further, in this example, the element contains Exemplified Compound C-5 whose absorption peak wavelength is 650 nm or more and less than 700 nm, and differs from the wavelength of the absorption peak of Exemplified Compound C-10 by 20 nm or more and 35 nm or less.

Example 2

An absorption spectrum and transmittance spectra were determined in the same manner as in Example 1 with the exception that Exemplified Compounds A-18 (64 mM), A-22 (54 mM), B-16 (16 mM), C-5 (7 mM), and C-10 (10 mM) were used as anodic EC compounds, and Exemplified Compounds D-1 (100 mM) and D-8 (30 mM) were used as cathodic EC compounds, and the fluctuation ratio $T_{ratio}$ with respect to the central transmittance $T_{mid}$ was determined for each of the transmittance spectra. The results are shown in Table 1. In this example, wavelength regions including the absorption peaks of the exemplified compounds during their coloring are as described below.

A-18: (2) from more than 430 nm to 510 nm or less
A-22: (2) from more than 430 nm to 510 nm or less
B-16: (3) from more than 510 nm to 570 nm or less
C-5: (4) from more than 570 nm to less than 700 nm
C-10: (5) 700 nm or more
D-1: (1) 430 nm or less and (4) from more than 570 nm to less than 700 nm
D-8: (1) 430 nm or less and (4) from more than 570 nm to less than 700 nm The EC element of this example contains Exemplified Compounds D-1 and D-8 each having an absorption peak at a wavelength that differs from the wavelength of the absorption peak of Exemplified Compound C-10, which is an organic EC compound having an absorption peak in the wavelength region (5), during the coloring by 80 nm or more and 130 nm or less.

Exemplified Compound C-10 is a compound having an absorption peak in the wavelength region of from 700 nm or more to 730 nm or less. In addition, in this example, the element contains Exemplified Compound C-5 whose absorption peak wavelength is 650 nm or more and less than 700 nm, and differs from the wavelength of the absorption peak of Exemplified Compound C-10 by 20 nm or more and 35 nm or less.

Example 3

An absorption spectrum and transmittance spectra were determined in the same manner as in Example 1 with the exception that Exemplified Compounds A-11 (55 mM), C-3 (33 mM), and C-10 (10 mM) were used as anodic EC compounds, and Exemplified Compounds D-4 (33 mM), D-10 (57 mM), and D-11 (75 mM) were used as cathodic EC compounds, and the fluctuation ratio $T_{ratio}$ with respect to the central transmittance $T_{mid}$ was determined for each of the transmittance spectra. The results are shown in Table 1. In this example, wavelength regions including the absorption peaks of the exemplified compounds during their coloring are as described below.

A-11: (2) from more than 430 nm to 510 nm or less
C-3: (5) 700 nm or more
C-10: (5) 700 nm or more D-4: (1) 430 nm or less and (4) from more than 570 nm to less than 700 nm
D-10: (1) 430 nm or less and (4) from more than 570 nm to less than 700 nm
D-11: (3) from more than 510 nm to 570 nm or less The EC element of this example contains Exemplified Compounds D-4 and D-10 each having an absorption peak at a wavelength that differs from the wavelength of the absorption peak of each of Exemplified Compounds C-3 and C-10, each of which is an organic EC compound having an absorption peak in the wavelength region (5), during the coloring by 80 nm or more and 130 nm or less.

Exemplified Compounds C-3 and C-10 are each a compound having an absorption peak in the wavelength region of from 700 nm or more to 730 nm or less.

Example 4

An absorption spectrum and transmittance spectra were determined in the same manner as in Example 1 with the exception that Exemplified Compounds A-13 (55 mM), A-14 (110 mM), B-11 (110 mM), and C-10 (15 mM) were used as anodic EC compounds, and Exemplified Compounds D-1 (50 mM), D-10 (25 mM), and D-11 (105 mM) were used as cathodic EC compounds, and the fluctuation ratio $T_{ratio}$ with respect to the central transmittance $T_{mid}$ was determined for each of the transmittance spectra. The results are shown in Table 1. In this example, wavelength regions including the absorption peaks of the exemplified compounds during their coloring are as described below.
A-13: (2) from more than 430 nm to 510 nm or less
A-14: (2) from more than 430 nm to 510 nm or less
B-11: (3) from more than 510 nm to 570 nm or less
C-10: (5) 700 nm or more
D-1: (1) 430 nm or less and (4) from more than 570 nm to less than 700 nm
D-10: (1) 430 nm or less and (4) from more than 570 nm to less than 700 nm
D-11: (3) from more than 510 nm to 570 nm or less The EC element of this example contains Exemplified Compounds D-1 and D-10 each having an absorption peak at a wavelength that differs from the wavelength of the absorption peak of Exemplified Compound C-10, which is an organic EC compound having an absorption peak in the wavelength region (5), during the coloring by 80 nm or more and 130 nm or less.

Exemplified Compound C-10 is a compound having an absorption peak in the wavelength region of from 700 nm or more to 730 nm or less.

Example 5

An absorption spectrum and transmittance spectra were determined in the same manner as in Example 1 with the exception that Exemplified Compounds A-13 (0.1 mM), A-14 (120 mM), B-12 (74 mM), and C-7 (11 mM) were used as anodic EC compounds, and Exemplified Compounds D-4 (35.4 mM), D-10 (32 mM), and E-7 (10 mM) were used as cathodic EC compounds, and the fluctuation ratio $T_{ratio}$ with respect to the central transmittance $T_{mid}$ was determined for each of the transmittance spectra. The results are shown in Table 1. In this example, wavelength regions including the absorption peaks of the exemplified compounds during their coloring are as described below.
A-13: (2) from more than 430 nm to 510 nm or less
A-14: (2) from more than 430 nm to 510 nm or less
B-12: (3) from more than 510 nm to 570 nm or less
C-7: (5) 700 nm or more
D-4: (1) 430 nm or less and (4) from more than 570 nm to less than 700 nm
D-10: (1) 430 nm or less and (4) from more than 570 nm to less than 700 nm
E-7: (5) 700 nm or more The EC element of this example contains Exemplified Compounds D-4 and D-10 each having an absorption peak at a wavelength that differs from the wavelength of the absorption peak of each of Exemplified Compounds C-7 and E-7, each of which is an organic EC compound having an absorption peak in the wavelength region (5), during the coloring by 80 nm or more and 130 nm or less.

Exemplified Compounds C-7 and E-7 are each a compound having an absorption peak in the wavelength region of from 700 nm or more to 730 nm or less.

TABLE 1

| | Fluctuation ratio $T_{ratio}$ in region of from 650 nm to 700 nm Optical density | | | Fluctuation ratio $T_{ratio}$ in region of from 430 nm to 700 nm Optical density | |
|---|---|---|---|---|---|
| | 0.3 | 0.9 | 1.5 | 0.3 | 0.9 |
| Example 1 | ±5.1% | ±11.7% | ±24.8% | ±10.0% | ±29.0% |
| Example 2 | ±3.0% | ±9.2% | ±14.8% | ±17.2% | ±34.7% |
| Example 3 | ±3.7% | ±11.7% | ±18.3% | ±12.1% | ±34.9% |
| Example 4 | ±3.0% | ±9.0% | ±14.9% | ±17.9% | ±49.0% |
| Example 5 | ±5.7% | ±16.8% | ±27.6% | ±8.6% | ±25.3% |

In each of Examples, it was confirmed that the fluctuation ratio with respect to the central transmittance was sufficiently small in the wavelength region of from 650 nm to 700 nm serving as a long-wavelength region or the wavelength region of from 430 nm to 700 nm, and hence the element had uniform spectral characteristics. In addition, the element had uniform spectral characteristics over a range from the region where the optical density was small to the region where the optical density was large (optical density: 1.5), and hence it was shown that an EC element having ND characteristics in a wide light quantity regulation range was able to be provided.

As described above, according to the present invention, the EC element that has uniform spectral characteristics up to a long-wavelength region and can achieve a wide light quantity regulation range can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138367, filed Jul. 10, 2015, and Japanese Patent Application No. 2016-094449, filed May 10, 2016, which are hereby incorporated by reference herein in their entirety.

The invention claimed is:
1. An electrochromic element, comprising:
a pair of electrodes; and
an electrochromic layer disposed between the pair of electrodes and containing a plurality of organic electrochromic compounds,
wherein when an optical density in a decolored state thereof is defined as 0, a fluctuation ratio of a transmittance in a first wavelength region of 650 nm to 700 nm with respect to a first central transmittance in the first wavelength region is within ±15% at an optical density of 0.3.

2. The electrochromic element according to claim 1, wherein when the optical density during decoloring is defined as 0, the fluctuation ratio is within ±10% at the optical density of 0.3.

3. The electrochromic element according to claim 1, wherein when the optical density during decoloring is defined as 0, the fluctuation ratio is within ±40% at an optical density of 0.9.

4. The electrochromic element according to claim 1, wherein when the optical density during decoloring is defined as 0, the fluctuation ratio is within ±20% at an optical density of 0.9.

5. The electrochromic element according to claim 1, wherein when the optical density during decoloring is defined as 0, the fluctuation ratio is within ±50% at an optical density of 1.5.

6. The electrochromic element according to claim 1, wherein when the optical density during decoloring is defined as 0, the fluctuation ratio of the transmittance in a second wavelength region of 430 nm to 700 nm with respect to a second central transmittance in the second wavelength region is within ±20% at the optical density of 0.3.

7. The electrochromic element according to claim 6, wherein the plurality of organic electrochromic compounds comprise a first compound, a second compound, a third compound, a fourth compound, and a fifth compound, which are different from each other, and
wherein, in a colored state thereof:
  a maximum absorption peak wavelength of the first compound is 430 nm or less;
  a maximum absorption peak wavelength of the second compound is more than 430 nm to 510 nm;
  a maximum absorption peak wavelength of the third compound is more than 510 nm to 570 nm;
  a maximum absorption peak wavelength of the fourth compound is more than 570 nm to less than 700 nm; and
  a maximum absorption peak wavelength of the fifth compound is 700 nm or more.

8. The electrochromic element according to claim 7, wherein at least one of the second compound and the third compound comprises a phenazine derivative.

9. The electrochromic element according to claim 7, wherein the fourth compound comprises a viologen derivative.

10. The electrochromic element according to claim 7, wherein a wavelength difference between the fourth compound and the fifth compound is 80 nm to 130 nm.

11. The electrochromic element according to claim 7, wherein the fifth compound has an absorption peak in a wavelength region of 700 nm to 730 nm.

12. The electrochromic element according to claim 7, wherein a wavelength difference between the fourth compound and the fifth compound is 20 nm to 35 nm.

13. The electrochromic element according to claim 1, wherein when the optical density during decoloring is defined as 0, the fluctuation ratio of the transmittance in a wavelength region of 430 nm to 700 nm with respect to the central transmittance is within ±40% at an optical density of 0.9.

14. The electrochromic element according to claim 1, wherein the electrochromic layer comprises a solution layer, and
  wherein a solution of the solution layer contains the plurality of organic electrochromic compounds.

15. An optical filter, comprising:
  the electrochromic element of claim 1; and
  an active element connected to the electrochromic element.

16. An imaging apparatus, comprising:
  the optical filter of claim 15; and
  a light-receiving element configured to receive light transmitted through the optical filter.

17. A window member, comprising:
  the electrochromic element of claim 1; and
  an active element connected to the electrochromic element.

18. The electrochromic element according to claim 1, wherein at least one of the plurality of organic electrochromic compounds comprises an organic electrochromic compound having an absorption peak in a wavelength region of 700 nm or more in a colored state thereof.

19. The electrochromic element according to claim 18, wherein the organic electrochromic compound having the absorption peak in the wavelength region of 700 nm or more during coloring contains an aromatic amine skeleton.

20. The electrochromic element according to claim 1, wherein the decolored state is a state in which when 0 V is continuously applied between the pair of electrodes, the transmittance of the electrochromic element does not to change.

21. The electrochromic element according to claim 1, wherein absorption spectra of the plurality of organic electrochromic compounds are different from each other.

* * * * *